United States Patent
Newnes et al.

[11] Patent Number: 5,879,129
[45] Date of Patent: Mar. 9, 1999

[54] CONTINUOUS BREAKDOWN TILT HOIST WITH OVERHEAD ROTATABLE SECONDARY HOIST

[75] Inventors: William R. Newnes; James B. Hannebauer, both of Salmon Arm, Canada

[73] Assignee: CAE Newens Ltd., Salmon Arm, Canada

[21] Appl. No.: 30,826

[22] Filed: Feb. 26, 1998

Related U.S. Application Data

[60] Provisional application No. 60/039,236 Feb. 28, 1997.
[51] Int. Cl.$^6$ .............................. B65G 59/02; B65G 59/08
[52] U.S. Cl. ...................................... 414/796.7; 414/796.2; 414/801
[58] Field of Search .............................. 414/796.2, 796.7, 414/801

[56] References Cited

U.S. PATENT DOCUMENTS

| | | | |
|---|---|---|---|
| 4,640,655 | 2/1987 | Jacobson | 414/796.2 |
| 4,838,748 | 6/1989 | Johnson | 414/796.7 |
| 5,249,915 | 10/1993 | Ritola | 414/796.7 |

FOREIGN PATENT DOCUMENTS

| | | | |
|---|---|---|---|
| 7501507-3 | 3/1977 | Sweden | B65G 59/08 |
| 7611325-7 | 2/1978 | Sweden | B65G 59/08 |

OTHER PUBLICATIONS

Dry Limber Sorter, 1986–87, Hammars Ahlströmföretagen, Sweden.

*Primary Examiner*—Janice L. Krizek
*Attorney, Agent, or Firm*—Antony C. Edwards

[57] ABSTRACT

A continuous breakdown tilt hoist having an overhead rotatable secondary hoist where the overhead rotatable secondary hoist is selectively rotatable about a pivot, selectively rotatable between an elevated non-engaging position into a lowered lumber stack translating position when primary hoist arms reach a raised position, the secondary hoist being selectively translatable between a lumber stack engaging position to a lumber stack discharging position, secondary hoist arms cantilevered outwardly of the secondary hoist so as to support a first lumber stack when the secondary hoist is in the lumber stack translating position, the secondary hoist arms being selectively translatable so as to translate the first lumber stack over a tier shearing edge, the primary hoist returnable from a reclined position to a lumber stack receiving position and the primary hoist arms returnable to a lower position for receiving a second lumber stack from a lumber stack conveyor, and elevating the second lumber stack to the tier shearing edge as the secondary hoist arms complete translating the first lumber stack over the tier shearing edge.

13 Claims, 8 Drawing Sheets

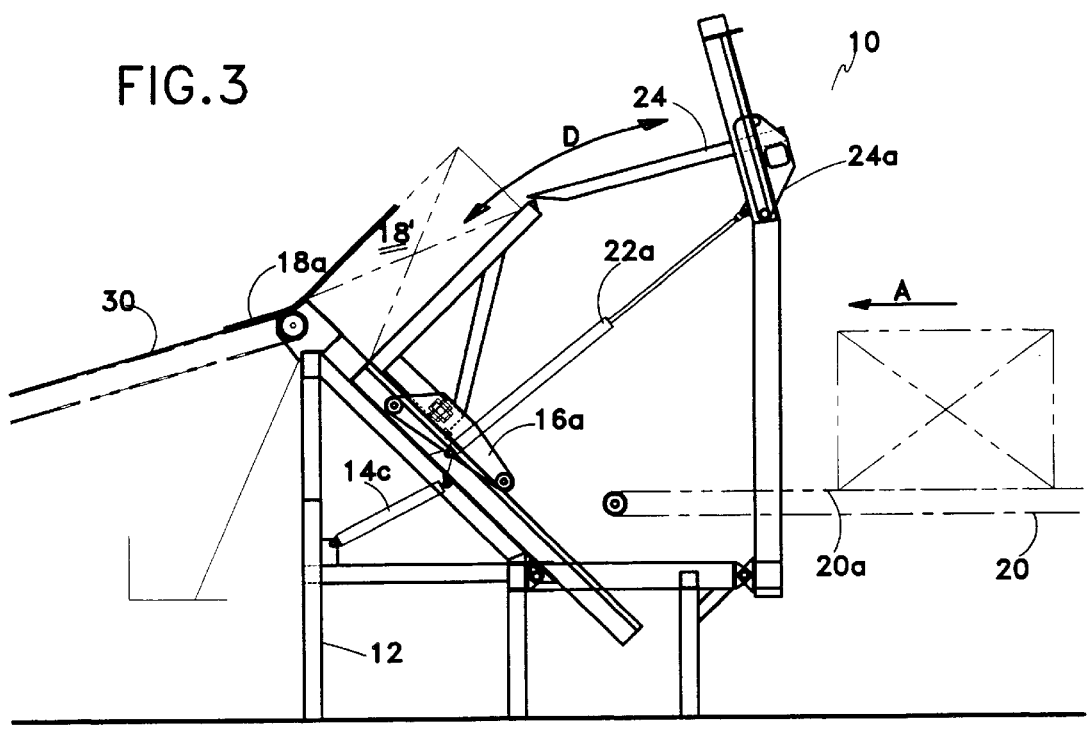
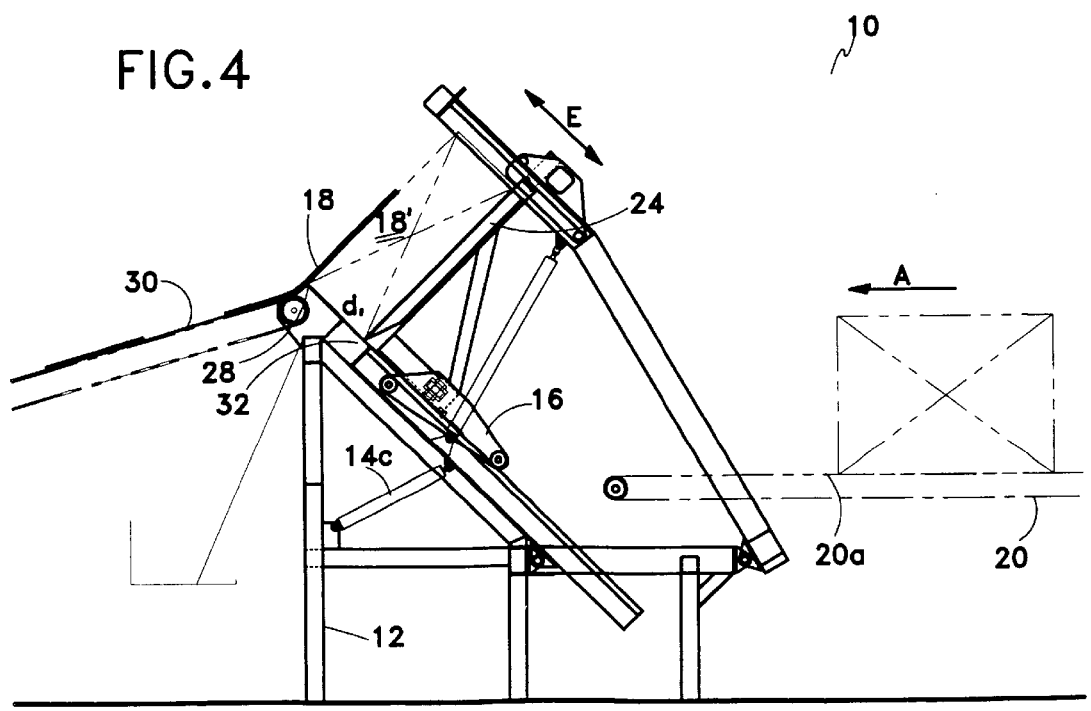

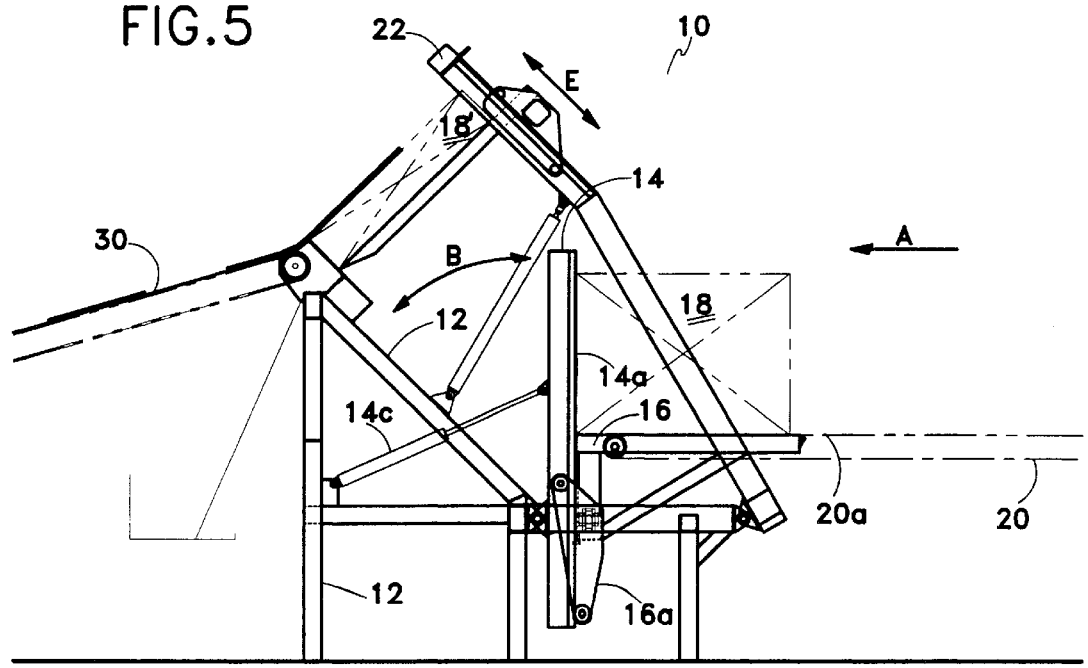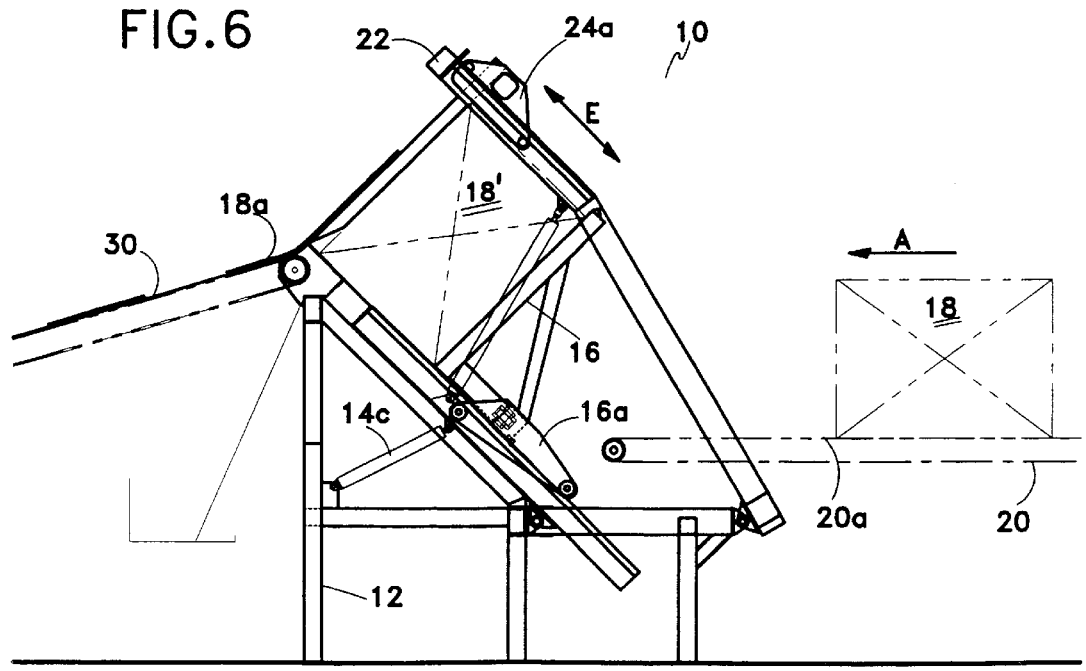

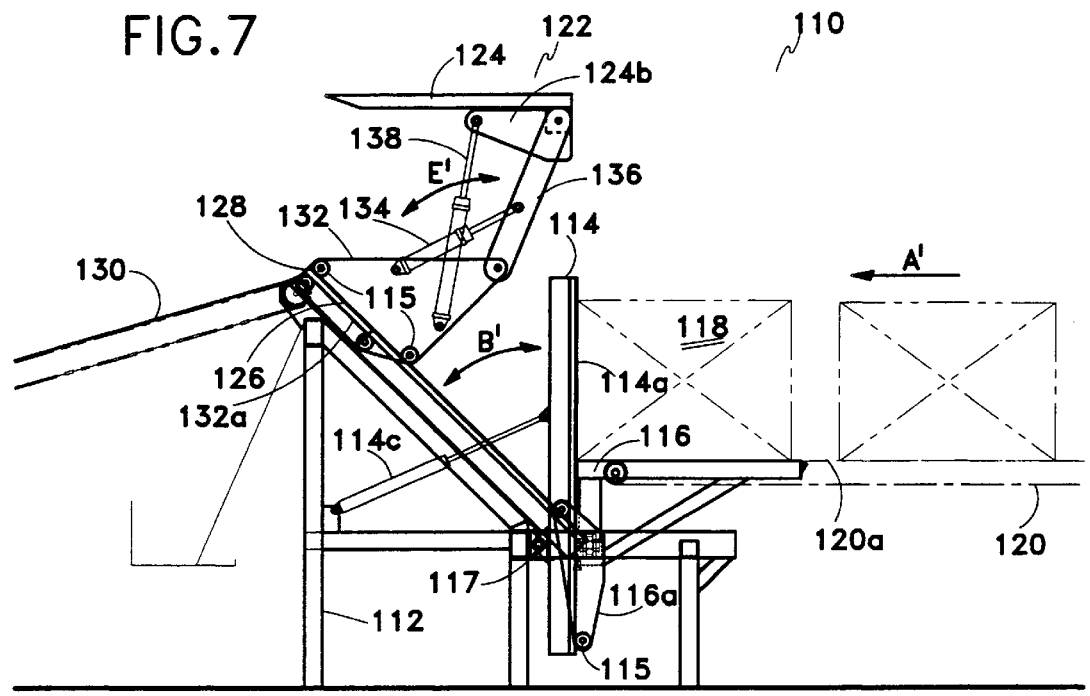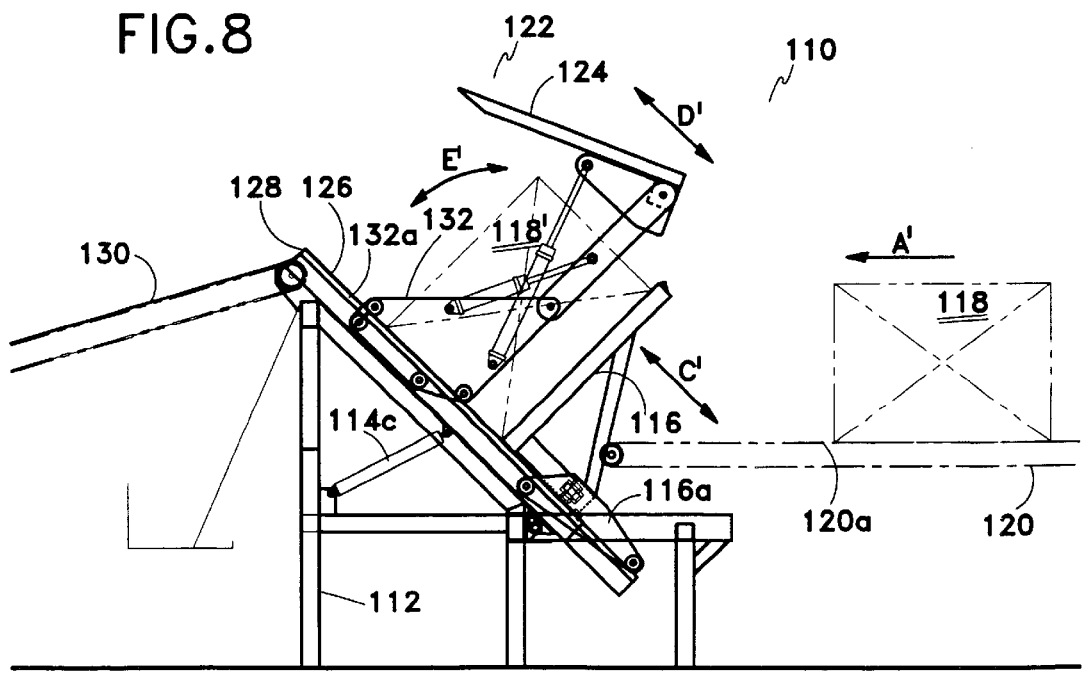

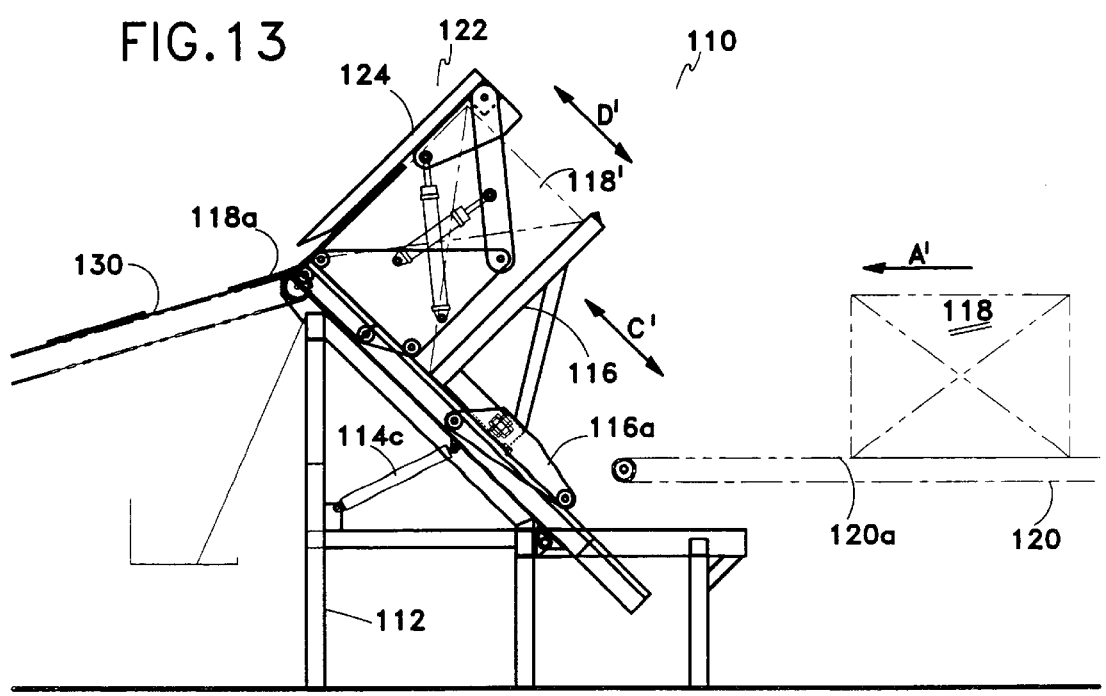

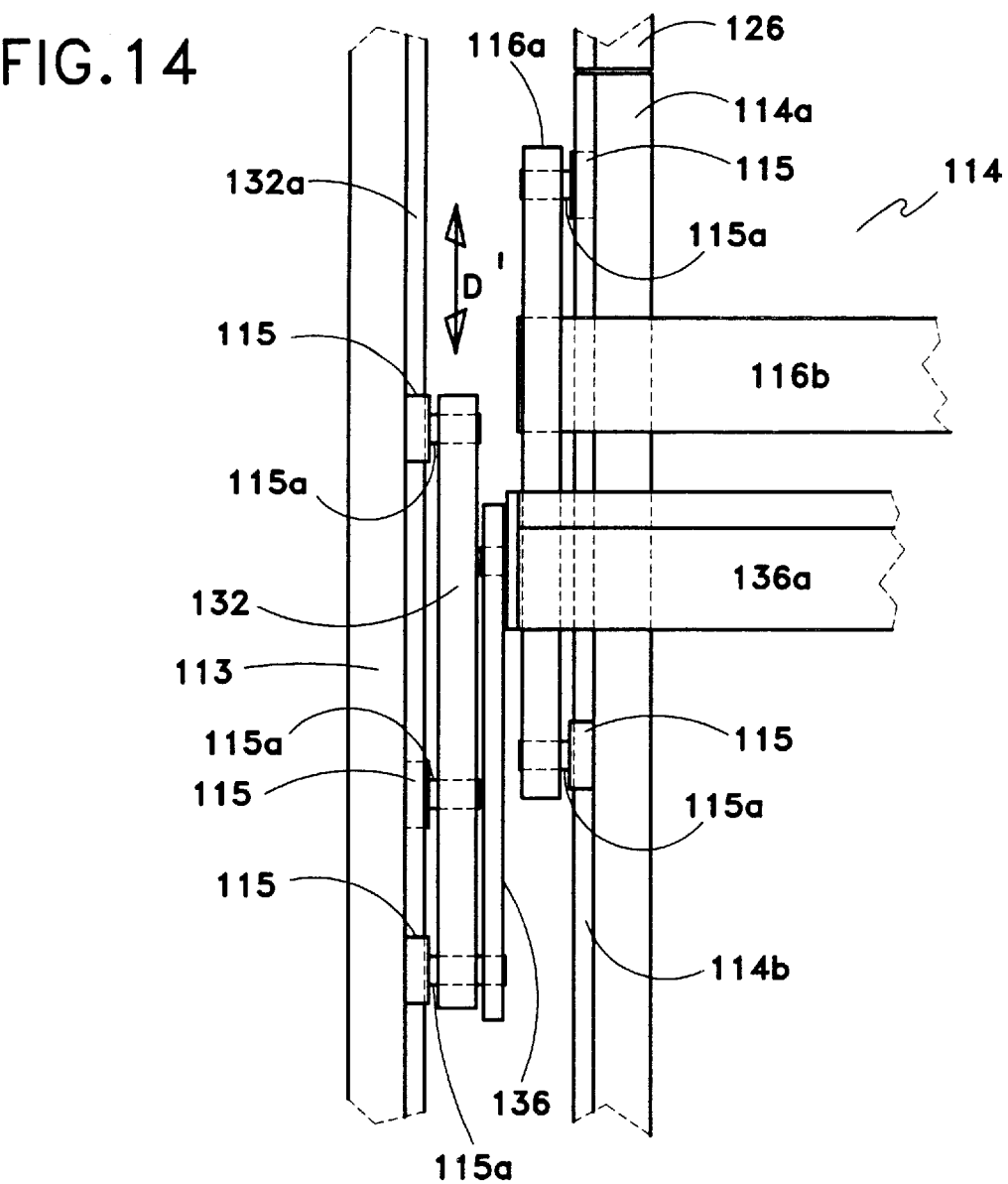

5,879,129

CONTINUOUS BREAKDOWN TILT HOIST WITH OVERHEAD ROTATABLE SECONDARY HOIST

CROSS REFERENCE TO RELATED APPLICATION

This application claims priority from U.S. Provisional Patent Application No. 60/039,236 filed Feb. 28, 1997 titled Continuous Breakdown Tilt Hoist With Overhead Rotatable Secondary Hoist.

FIELD OF THE INVENTION

This invention relates to an apparatus for breaking down stacked, or stacked and stickered rough lumber, and in particular relates to an apparatus capable of continually feeding and breaking down stacked and stickered rough lumber by the interaction of an overhead secondary tilt hoist, with a lower primary tilt hoist.

BACKGROUND OF THE INVENTION

As known in the art, to breakdown a stack of stacked and stickered lumber (hereinafter referred to as a lumber stack), a lumber stack arrives on an infeed transfer chain, which places the lumber stack over a rotatable hoist frame which has been rotated up-right to receive the lumber stack, where once the lumber stack is positioned over the hoist arms, the hoist is rotated back to an incline, where the hoist then lifts the lumber stack up the inclined surface formed by the inclined hoist frame, so as to discharge under the force of gravity rows or tiers of individual pieces of lumber from the top of the lumber stack, as the top of the lumber stack is pushed beyond the uppermost end of the frame.

It is also known to assist lifting the lumber stack towards the uppermost end of the frame so as to discharge tiers of lumber from the stack by providing secondary lumber stack support arms which at some intermediate transfer point take over the upward translation of the lumber stack from the primary lumber stack support arms on the rotatable frame.

In particular, applicant is aware of U.S. Pat. No. 4,838,748 which issued on Jun. 13, 1989 to Johnson for a device entitled "Hoist and Accumulator Anm Apparatus". Johnson teaches a rotatable hoist frame for rotating a lumber stack, from an upright position into an inclined position flush with an accumulator arm apparatus. Hoist frame hoisting support members translate up the incline to slide the load of tiered material upwards onto a similarly inclined frame surface on the accumulator arm apparatus. Retracted accumulator arms in the accumulator arm apparatus extend upwardly from under the inclined frame surface, once the load of tiered material has been slid from the hoist frame onto the accumulator arm apparatus. The accumulator arms take over from the hoist frame horizontal supports and slide the partial lumber stack further upwards to a discharge point at the uppermost edge of the accumulator arm apparatus. The accumulator arms then retract and are repositioned ready to accept the next partial lumber stack which has been transferred up the hoist frame.

Also, applicant is aware of Swedish Patent 392,453 which issued on Mar. 28, 1977 to Hellstrom, for a device entitled "Arrangement for Feeding of a Package of Goods Such as a Package of Lumber". This apparatus is similar in operation to the Johnson apparatus. However, the secondary accumulator apparatus is mounted above the inclined face, and extends down under the partial lumber stack to take over the translation from the lower hoist frame.

Also, applicant is aware of U.S. Pat. No. 5,249,915 which issued on Oct. 5, 1993 to Ritola for a device entitled "Dual Independent Hoist Breakdown Station". This apparatus accomplishes similar lumber stack breakdown operation as the above devices, with accumulator arms being used for both primary and secondary hoists. There is also an additional tilting frame needed, that rotates up to receive the lumber stack and then rotates back against the inclined face where the primary accumulator arms are extended under the lumber stack to begin translating of the lumber stack up the inclined face.

It is also known in the industry that some long loads of lumber (particularly long thin lumber) can hang up on the unsupported end causing the lumber to come off the tilt hoist skewed and then bunched up, where the operator would then have to shut down the tilt hoist and the outfeed transfer and then unscramble the lumber by hand before restarting the outfeed transfer and tilt hoist.

SUMMARY OF THE INVENTION

A tilt hoist for the continuous break down of a lumber stack, which has a rotatable primary hoist and a rotatable secondary overhead hoist. The primary hoist has a primary face such that a lumber stack may be translated by sliding upwards over the face when the primary hoist is inclined. The primary hoist includes a plurality of cantilevered translatable hoist arms for receiving the lumber stack from an infeed transfer. The secondary overhead hoist also includes a plurality of cantilevered translatable secondary hoist arms for taking over the hoisting of a partial lumber stack from the primary hoist. A support frame supports a secondary face, which is inclined and aligned with the top of the primary face when the primary hoist is inclined. The partial stack is translated over the secondary face by the secondary overhead hoist, which frees the primary hoist to be lowered and rotated up into the receiving position for the next lumber stack. At the top of the secondary face there is a discharge point, hereinafter referred to as a shear point. Both primary and secondary faces may include sheeting, whereby spacing sticks within the lumber stack will then translate along with the lumber stack without falling behind the apparatus.

The primary tilt hoist starts the hoisting cycle with the primary hoist arms at the bottom of the primary hoist's stroke. The primary hoist has been rotated up to a vertical position, to the stack receiving position, wherein the hoist arms then engage the underside of the lumber stack once the lumber stack has been advanced by the infeed transfer to the receiving position. The primary hoist is rotated back into the inclined position against stops, whereupon the primary and secondary faces are aligned flush, allowing for translation of the lumber stack up the primary face and onto, and up along, the secondary face.

The primary hoist continuously translates the lumber stack up to and over the shear point. Tiers are sheared from the lumber stack at the shear point. Sheared tiers slide onto the outfeed transfer. As the bottom of the lumber stack reaches the top of the primary face and the bottom of the secondary face, the secondary hoist arms are rotated down to a position under the remaining lumber stack, that is, the partial lumber stack on the secondary face. The secondary hoist arms then begin to translate up along the secondary hoist so as to lift the remaining lumber stack up the secondary face, whereby the tiers on top of the lumber stack continue to discharge over the shear point.

As the secondary hoist arms are discharging the remaining lumber stack, the primary hoist arms lower along the primary hoist and the primary hoist then rotates into the lumber stack receiving position to receive another lumber stack from the lumber stack infeed transfer. The primary hoist is then rotated back with the new lumber stack to the inclined position. The lumber stack is then translated up to the bottom of the partial lumber stack on the secondary face as the secondary hoist arms are completing discharging the last tier of the partial lumber stack. As the next lumber stack reaches the bottom of the secondary hoist arms, the secondary hoist arms are raised up out of the path of the oncoming lumber stack as it reaches the shear point and the oncoming lumber stack then begins to discharge it's tiers over the shear point. There is no need for a pause in the discharge of tiers between lumber stacks.

The secondary hoist arms are translated down the secondary hoist uprights. Once at the bottom of their travel stroke, they may be lowered into position under the next lumber stack as it is reduced in size and the bottom of the stack comes up to the point where the primary hoist arms and the secondary hoist arms may change over. Lumber stacks are thus deposited over the shear point of the inclined face onto the outfeed transfer device.

In an alternative embodiment, the shear point is flexible across the top of the secondary face and may be automatically adjustable to adjust its position so as to allow for the clean discharge of longer lengths of lumber, which may hang down on their unsupported ends. An end of the shear point may be equipped with a photo sensor that detects any bowed or hanging ends of longer unsupported lumber pieces across the top of the secondary face and automatically lowers that end of the shear point to clear the drooping lumber ends for unobstructed discharge.

Within the preferred embodiment the primary hoist arms may translate up to the shear point to complete a hoisting cycle without the secondary hoist, as a back-up contingency, when the secondary overhead tilt hoist may be inoperative for repair or maintenance, or in the event where the lumber stack supply is depleted and there is no need for operating in the continuous breakdown mode, thus saving wear and tear on the secondary tilt hoist.

In summary, the continuous breakdown tilt hoist having an overhead rotatable secondary hoist includes a primary tilt hoist, and an overhead secondary hoist. The primary tilt hoist and the overhead secondary hoist are mounted on a supporting frame. The primary tilt hoist includes parallel primary track members, and primary hoist arms selectively translatable on the primary track members. The overhead secondary hoist includes parallel secondary track members, and secondary hoist arms selectively translatable on the secondary track members, wherein the secondary hoist arms are selectively pivotable relative to a secondary face on an upper end of the supporting frame.

The primary tilt hoist is selectively pivotable relative to the supporting frame from a generally upright lumber stack receiving position to a reclined lumber stack translating position. The primary hoist arms are cantilevered outwardly of the primary track members so as to cooperate with an adjacent lumber stack conveyor to receive a first lumber stack from the lumber stack conveyor onto the primary hoist arms when the primary tilt hoist is in the lumber stack receiving position. In the lumber stack translating position the primary hoist is reclined and the first lumber stack, when on the primary hoist arms, is reclined against a primary hoist face on the primary hoist for sliding translation over the primary hoist face upon the selective translation of the primary hoist arms on the primary track members. Wherein, when the primary hoist is in the reclined lumber stack translating position, the primary hoist face is generally flush with a stack receiving edge of the secondary face, the secondary face extending between the stack receiving edge and a tier shearing edge. At the tier shearing edge, first tiers of lumber sequentially shear from the first lumber stack as the first lumber stack is urged over the secondary face on the primary hoist arms as the primary hoist arms translate to a raised position.

The secondary hoist arms are selectively pivotable between an elevated non-engaging orientation and a lowered lumber stack engaging and translating orientation. The secondary hoist arms are pivotable into the lowered lumber stack engaging and translating orientation when the primary hoist arms reach the raised position, the secondary hoist arms selectively translatable when in the lowered lumber stack engaging and translating orientation between a lumber stack engaging position adjacent and under the first lumber stack and a lumber stack discharged position generally adjacent the tier shearing edge, so as to translate the lumber stack over the secondary face and over the tier shearing edge.

The secondary hoist arms are selectively pivotable between the elevated non-engaging orientation and the lowered lumber stack engaging and translation orientation by means of a pivoting action about a pivot mounted below and upstream of the secondary hoist arms relative to a direction of translation of the first lumber stack up and along the primary face and the secondary face.

The primary hoist is pivotable from the reclined position to the lumber stack receiving position and the primary hoist arms translatable to the lower position for receiving a second lumber stack from the lumber stack conveyor.

The reclining of the primary hoist and the translation of the primary hoist arms from the lower position to the raised position, and the pivoting of the secondary hoist arms, are selectively sequencable by sequencing means. Thus, as the secondary hoist arms reach the lumber stack discharged position so as to deposit a bottom-most tier of the first lumber stack over the tier shearing edge, the second lumber stack has been received from the lumber stack conveyor onto the primary hoist arms, reclined on the primary hoist, and translated upwardly so as to position a top tier of the second lumber stack beneath and generally adjacent the secondary hoist arms as the secondary hoist arms reach the lumber stack discharged position and commence pivoting clear of the tier shearing edge into the elevated non-engaging position. The secondary hoist arms once pivoted into the elevated non-engaging orientation are then translatable to the lumber stack engaging position and pivotable into the lowered lumber stack engaging and translating orientation beneath the second lumber stack. The secondary hoist arms are selectively pivotable on a pivot member.

In one embodiment, the pivot member is rigidly mounted to the secondary track members at one end of the pivot member, and pivotally mounted at an opposite end of the pivot member to the supporting frame. The secondary hoist arms are rigidly mounted to secondary hoist trolleys. The secondary hoist trolleys are slidingly mounted on the secondary track members. The pivot member is pivotally mounted to the supporting frame generally at an end of the supporting frame adjacent the lumber stack conveyor.

Advantageously, the secondary track members are generally parallel to the primary track members when the secondary hoist arms are in the lumber stack engaging and translating orientation, and the secondary track members are offset above the primary track members when the secondary hoist arms are in the lumber stack engaging and translating orientation. The secondary track members are lowered on the pivot member so as to pivot the secondary hoist arms from the elevated non-engaging orientation to the lowered lumber stack engaging and translating orientation.

Further advantageously, the pivot member is a laterally spaced apart pair of first and second pivoting beams or other rigid members, laterally spaced apart so as to accommodate the first and second lumber stacks being translated therebetween on the primary tilt hoist.

The secondary hoist arms extend perpendicularly from the secondary track members substantially a distance equal to the offset of the secondary track members above the primary track member when the secondary hoist arms are in the lumber stack engaging and translating orientation.

In an alternative embodiment, the pivot member is pivotally mounted at a first end of the pivot member to secondary hoist trolleys. The secondary hoist trolleys are slidingly mounted on the secondary track members, and the pivot member is selectively pivotable relative to the secondary hoist trolleys. The pivot member is pivotally mounted at a second end of the pivot member, opposite the first end of the pivot member, to the secondary hoist arms. The secondary hoist arms are selectively pivotable relative to the pivot member. The pivot member may be at least one laterally spaced apart pair of link members, laterally spaced apart a distance to accept therebetween the first and second lumber stacks when translated on the primary tilt hoist.

In the continuous breakdown tilt hoist embodiments above, the method of the present invention includes the steps of:

a) receiving the first lumber stack onto the primary hoist arms when the primary hoist is in the lumber stack receiving position, b) reclining the primary hoist into the lumber stack translating position and elevating the first lumber stack to the raised position, c) pivoting the secondary hoist arms from the non-engaging orientation to the lowered lumber stack engaging and translating orientation in the lumber stack engaging position, d) translating, during a first time interval, the secondary hoist arm from the lumber stack engaging position to the lumber stack discharged position, e) simultaneously during the first time interval:
   i) translating the primary hoist arms from the raised position to a lowered position and pivoting the primary hoist from the reclined lumber stack translating position to the lumber stack receiving position,
   ii) receiving a second lumber stack onto the primary hoist arms,
   iii) reclining the primary hoist into the lumber stack translating position and elevating the second lumber stack so as to elevate the top tier of the second lumber stack to the tier shearing edge and so as to shear the top tier from the second lumber stack as the bottommost tier of the first lumber stack slides past the tier shearing edge, f) pivoting, at the end of the first time interval, the secondary hoist arms from the lowered lumber stack engaging and translating orientation to the non-engaging orientation, and sequentially or simultaneously, g) translating the secondary hoist arms to the lumber stack engaging position.

The cycle repeats for breakdown of further lumber stacks.

It is therefore an object of the present invention to provide an apparatus that improves on the efficiency of previously known devices, and may reduce the height of the device compared with other known devices, and to provide a truly continuous breakdown tilt hoist, thus improving on the breakdown speed of previously known devices of the general type.

The invention provides other advantages which will be made clear in the description of the preferred embodiments.

BRIEF DESCRIPTION OF THE DRAWINGS

FIG. 3 is a side elevation view of the tilt hoist showing the primary hoist lifting and discharging a lumber stack;

FIG. 4 is a side elevation view of the tilt hoist, showing the secondary hoist taking control of a partial lumber stack;

FIG. 5 is a side elevation view of the tilt hoist, showing the secondary hoist discharging a partial lumber stack;

FIG. 6 is a side elevation view of the tilt hoist, showing the secondary hoist finishing discharging the first lumber stack, with the primary hoist raising the next lumber stack up under the secondary hoist arms to begin discharging.

FIG. 7 is a side elevation view of the tilt hoist showing the primary hoist in an upright position, receiving a lumber stack;

FIG. 8 is a side elevation view of the tilt hoist showing the primary hoist rotated back to the inclined position and lifting a lumber stack;

FIG. 13 is a side elevation view of the tilt hoist, showing the primary hoist beginning to spill another stack immediately after the secondary hoist has finished discharging;

FIG. 14 is a partial plan view of the tilt hoist's primary and secondary trolleys.

DETAILED DESCRIPTION OF THE PREFERRED EMBODIMENT

Figure 1:
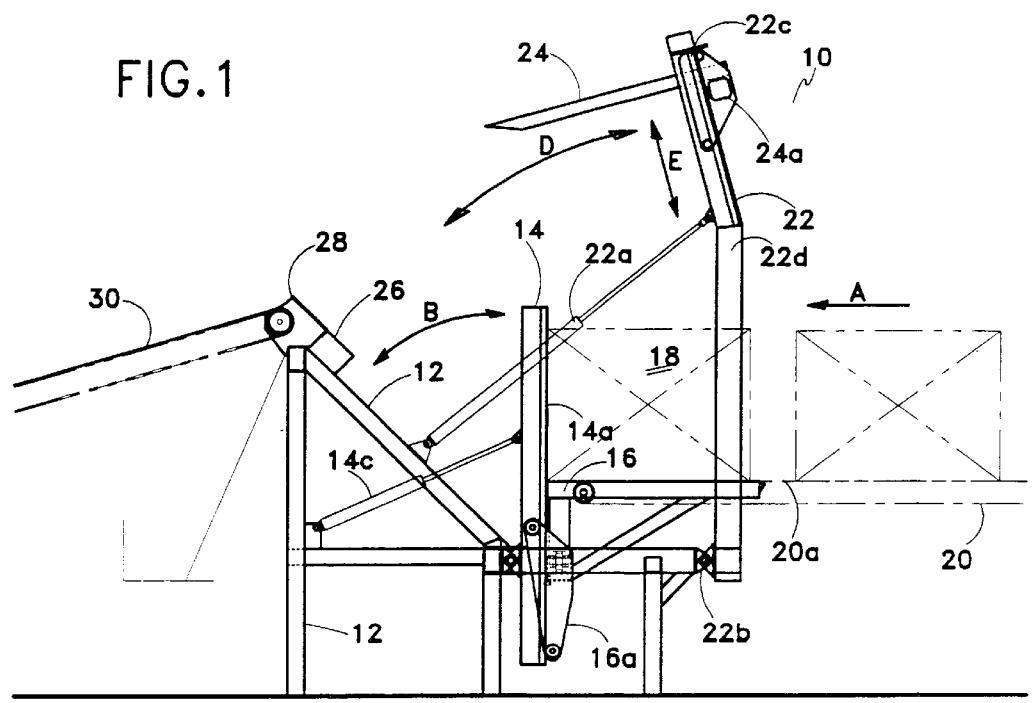
FIG. 1 is a side elevation view of the tilt hoist showing the primary hoist in an upright position, receiving a lumber stack.

Referring to the drawing figures wherein similar characters of reference represent corresponding parts in each view, the apparatus is generally indicated by the reference numeral 10.

Figure 2:
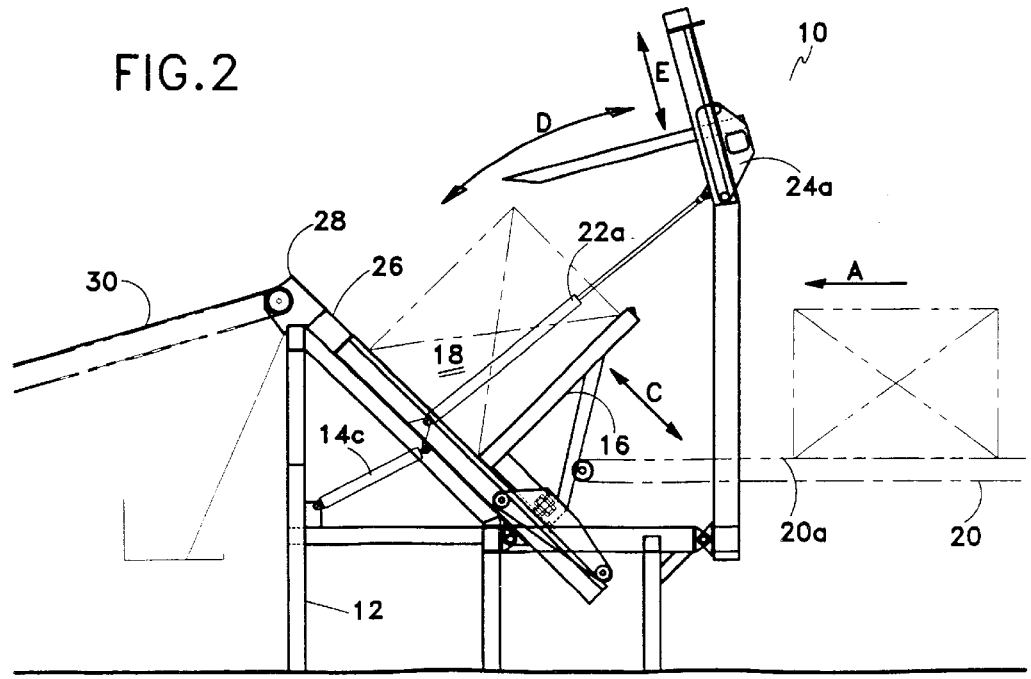
FIG. 2 is a side elevation view of the tilt hoist showing the primary hoist rotated back to the inclined position and lifting a lumber stack.

As seen in FIGS. 1 to 6, apparatus 10 includes a support frame constructed of various vertical and horizontal structural members 12. Primary hoist 14 has primary hoist arms 16 to receive lumber stack 18. Infeed transfer chains 20 are arranged in proximity to apparatus 10 so that the lumber stack engaging surfaces 20a of infeed transfer chains 20 are substantially aligned with the upper surfaces of primary hoist arms 16, when primary hoist 14 is in the upright receiving position and primary hoist arms lowered. Infeed transfer chains 20 may thus transfer lumber stack 18 in direction A in over primary hoist arms 16 so as to abut lumber stack 18 against primary hoist face 14a when primary hoist 14 is in the upright receiving position. Primary hoist 14 includes rotation cylinder 14c which rotates primary hoist 14 in direction B into the lumber stack 18 receiving position, as seen in FIG. 1, and back into the lumber stack 18 translating position as seen in FIG. 2. Primary hoist face 14a provides a surface for lumber stack 18 to translate in direction C. Primary hoist arms 16 are supported on primary arm trolleys 16a. Trolleys 16a are hoisted along primary hoist 14 in direction C by selectively actuable hoisting means (not shown).

Secondary hoist 22 has secondary hoist arms 24 to receive lumber stack 18 from primary hoist arms 16. Secondary hoist arms 24 are supported by secondary hoist arm trolleys 24a. Secondary face 26 is flush with primary hoist face 14a when hoist 14 is in the lumber stack translating position. As lumber stack 18 is translated up secondary face 26, tiers of lumber 18a are sheared from the stack at shear point 28 and slide from lumber stack 18 onto outfeed transfer 30.

As best seen in FIGS. 3 and 4, secondary hoist 22 includes rotation cylinder 22a which rotates, about pivot pins 22b, secondary hoist 22 in direction D from the upright position to the inclined position, where the secondary hoist arms 24 are translated up under lumber stack 18 to take over translation of the remainder of lumber stack 18 from primary hoist arms 16. Within the secondary hoist 22 are provided, at the uppermost end, secondary track members 22c over which the secondary hoist arm trolley 24a may be translated. Secondary track members 22c may be a pair of laterally spaced apart parallel track members, although only one of such tracks may be seen in the side elevation views. The secondary track members are supported on, and rigidly mounted to, rigid pivot members 22d. Secondary hoist 22 also includes a selectively actuable hoisting means (not shown) for selectively translating secondary hoist arms 24 and trolley 24a.

Figure 10:
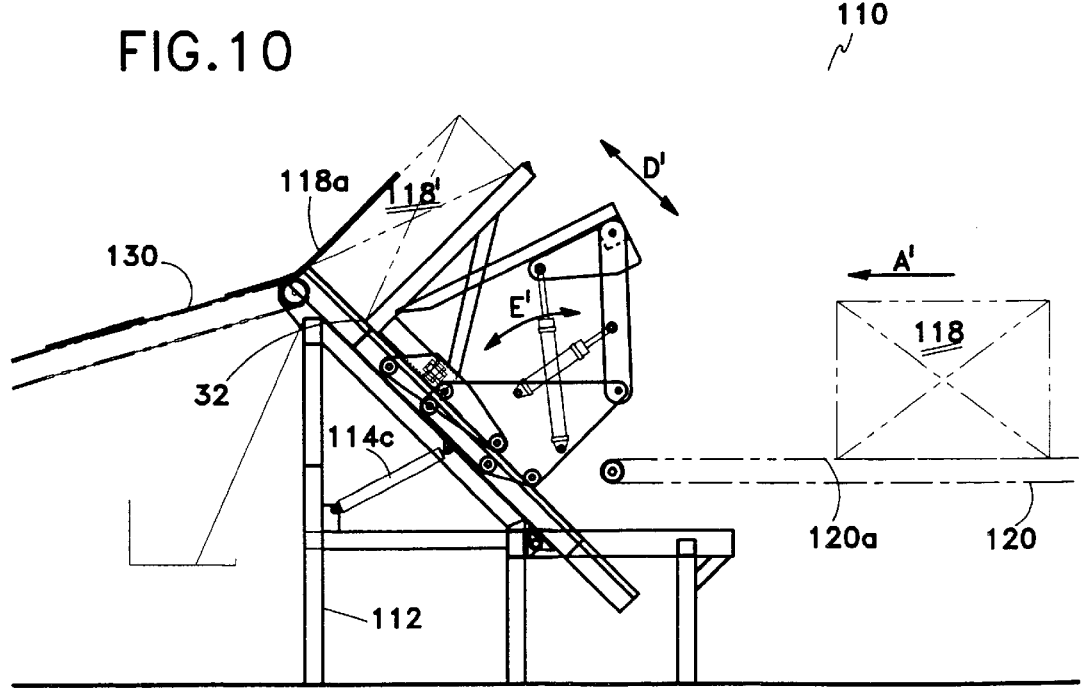
FIG. 10 is a side elevation view of the tilt hoist, showing the secondary hoist taking control of a partial lumber stack.
Figure 11:
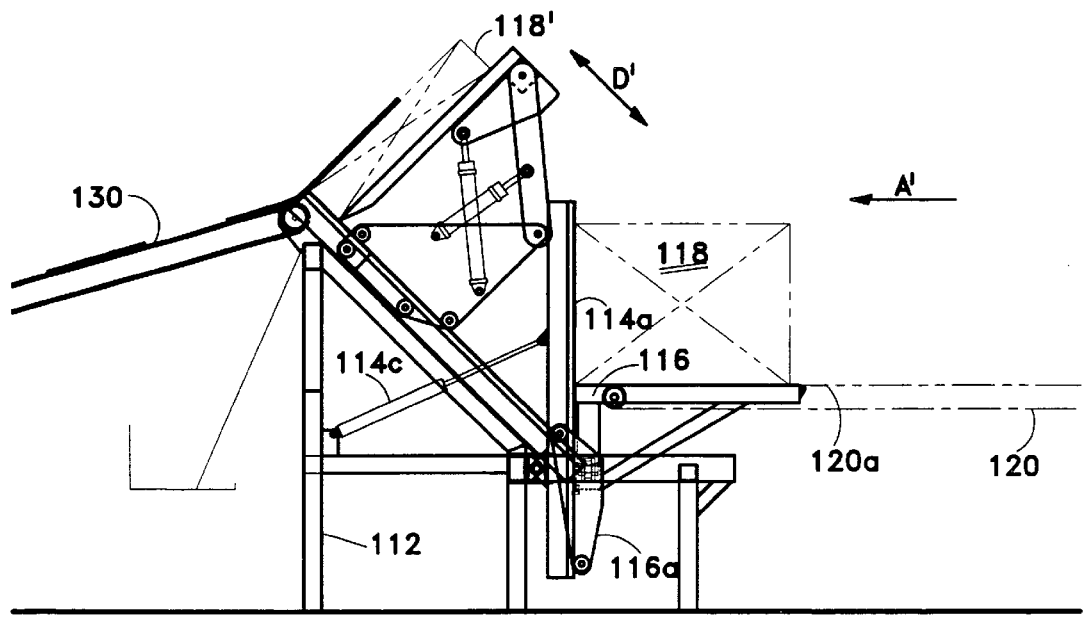
FIG. 11 is a side elevation view of the tilt hoist, showing the secondary hoist discharging a partial lumber stack.
Figure 12:
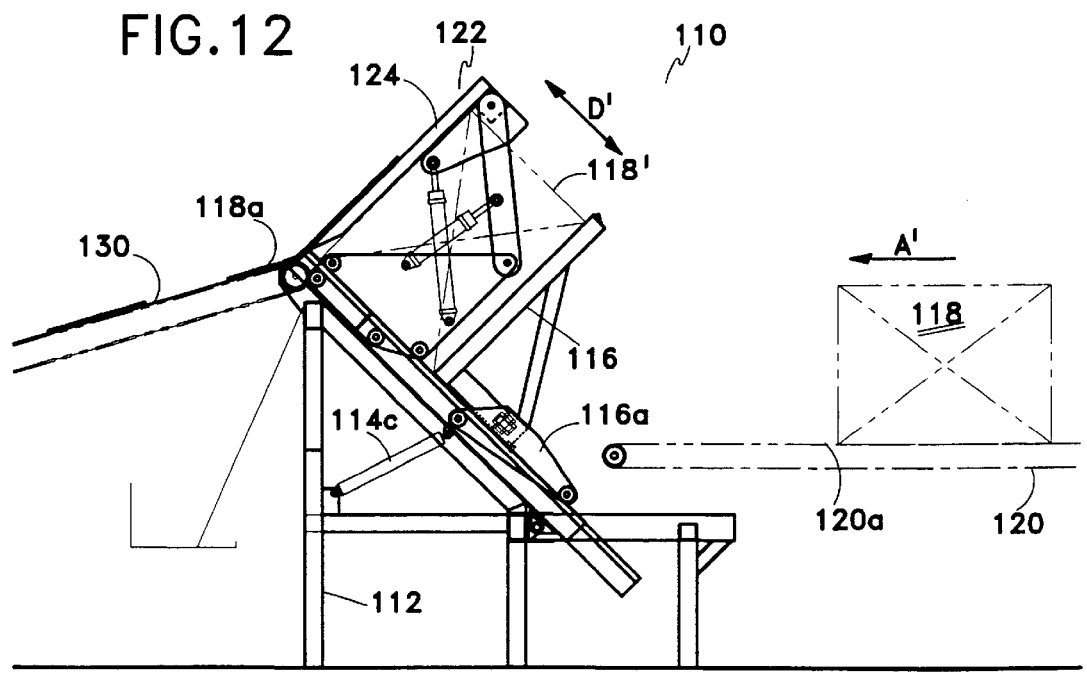
FIG. 12 is a side elevation view of the tilt hoist, showing the secondary hoist finishing discharging the first lumber stack, with the primary hoist raising the next lumber stack up under the secondary hoist arms to begin discharging.

In this embodiment, and in the alternative embodiment described below, to achieve truly continuous feeding of the tiers of lumber over the shear point, the hoisting by the primary hoist is timed so that the uppermost tier on a complete lumber stack 18 reaches the shear point 28 as the last, that is, bottommost, tier on partially broken down lumber stack 18' slides from secondary hoist arms 24 over shear point 28. Thus, the location 32, in relation to the primary and secondary hoisting faces, of the secondary hoist arms 24 at their lowermost point of travel of the secondary hoist arms, that is, the location of the secondary hoist arms after they are first rotated under a partially broken down lumber stack 18' on the primary hoist arms 16, depends on the translation speed of both the primary hoist arms and the secondary hoist arms. Location 32 is seen in FIGS. 4 and 10.

In the time ($t_1$) it takes secondary hoist arms 24 to translate the distance $d_1$ between location 32 and shear point 28 so as to complete breakdown of partially broken down lumber stack 18', primary hoist arms 14 must translate to the bottom of their stroke, receive a new lumber package 18 from infeed conveyor 20, and return to the upper end of their stroke so that the top tier of the new lumber package 18 starts sliding past shear point 28 as the last tier of the partially broken down lumber stack 18' leaves the secondary hoist arms 24 over shear point 28.

The only break in continuity may be the moment it takes for the secondary hoist arms 24 to rotate clear of shear point 28 as the top tier of the new lumber stack 18 is elevated up underneath the secondary hoist arms as they are being rotated clear of shear point 28.

The length of time $t_1$, dictates how many tiers of lumber must initially be in partially broken down lumber stack 18' as the secondary hoist arms 24 take over from the primary hoist arms 14, that is, the length of distance $d_1$. The longer it takes for the primary hoist to pick up and elevate the new lumber stack, that is, the greater $t_1$, the greater the number of tiers and the heavier the partially broken lumber stack 18' will be. The slower the primary hoist, the stronger must be the load bearing design of the secondary hoist. Thus, location 32 may be on the secondary face 26 or on an upper end of the primary hoist face 14a, depending on the cycle time of the primary hoist.

An alternative embodiment is provided for situations where the clearance between the roof or ceiling and the top of the secondary hoist is insufficient for installation of the preferred embodiment described above. In this alternative embodiment, as seen in FIGS. 7–14, apparatus 110 includes a support frame constructed of various vertical and horizontal structural members 112. Apparatus 110 includes primary hoist 114 having primary hoist arms 116 on which to receive lumber stack 118.

Infeed transfer chains 120 may be arranged in proximity to apparatus 110 so that the lumber stack engaging surfaces 120a of infeed transfer chains 120 are substantially aligned with the surfaces of primary hoist arms 116, when primary hoist 114 is in the upright receiving position. Primary hoist 114 includes rotation cylinder 114c. Infeed transfer chains 120 may thus transfer lumber stack 118 in direction A', over primary hoist arms 116, so as to abut lumber stack 118 against hoist face 114a when primary hoist 114 is in the upright receiving position. Rotation cylinder 114c rotates primary hoist 114 in direction B' between the lumber stack 118 receiving position seen in FIG. 7 and the lumber stack 118 translating position seen in FIG. 8. Primary face 114a provides a surface over which lumber stack 118 may be translated in direction C' by means of primary hoist trolleys 116a. Primary hoist trolleys 116a are hoisted, selectively, along a set of parallel primary tracks, such as tracks 114b and secondary hoist trolley 132 is hoisted, selectively, along a set of parallel secondary tracks, such as tracks 132a by hoisting means (not shown) such as hydraulic cylinders or the like. It is understood that, although only one hoist trolley 116a and only one hoist trolley 132 is illustrated, a pair of each of such trolleys, laterally spaced apart, are required so that the trolleys may ride along the track members, one trolley on each such member.

Secondary hoist 122 has secondary hoist arms 124 to receive lumber stack 118 from primary hoist arms 116. Secondary face 126 is aligned with, and above primary face 114a when primary hoist 114 is in the translating position. Lumber stack 118 is translated up along secondary face 126 by secondary hoist 122 so as to shear tiers of lumber 118a from lumber stack 118 at shear point 128, and onto outfeed transfer 130.

Figure 9:
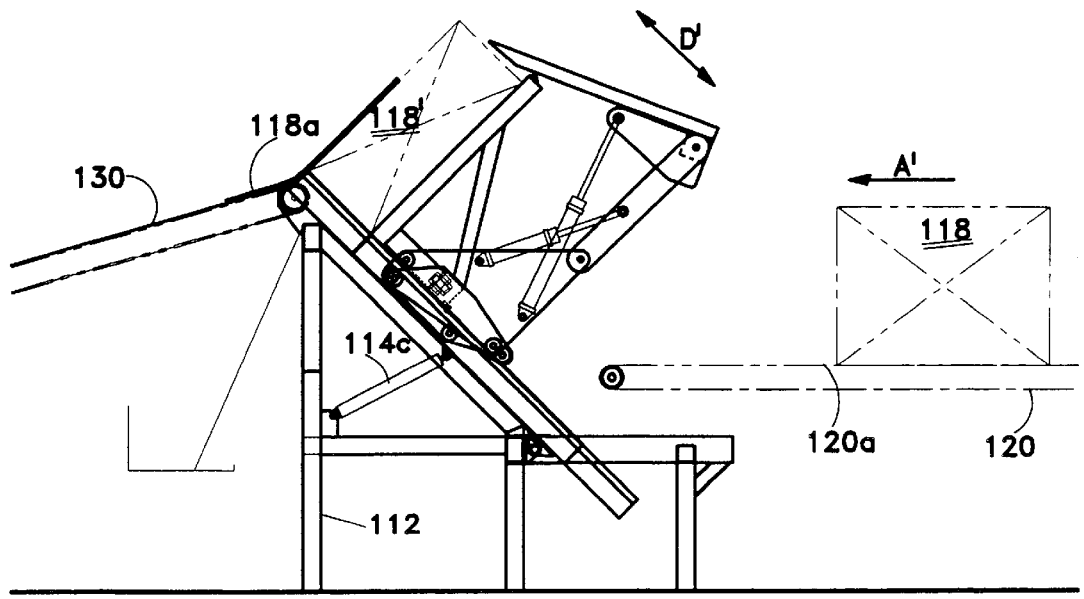
FIG. 9 is a side elevation view of the tilt hoist showing the primary hoist lifting and discharging a lumber stack.

As best seen in FIGS. 9 and 10, secondary hoist trolley 132, which is mounted on secondary hoist 122 translates on track 132a in direction D'. The laterally spaced apart pair of tracks 132a are rigidly mounted to, and outboard of, structural members 112. Again, although only one track 132a and corresponding secondary hoist trolley 132, and only one track 114b and corresponding primary hoist trolley 116a are shown in FIGS. 7–14, it is understood that a mirror image, that is, a second track 132a, trolley 132, track 114b and trolley 116a are supported. Secondary hoist arms 124 are rigidly mounted to crossmember 136a as seen in FIG. 14. Crossmember 136a is pivotably mounted to a pivot member such as link 136. Crossmember 116b is rigidly mounted to primary hoist trolley 116a. Primary hoist arms 116 are rigidly mounted to crossmember 116b. Tracks 132a and 114b may be rigid flanges rigidly mounted to, respectively, secondary hoist frame members 113 and primary hoist 114, so as to extend outwardly thereof. Wheels 115, or like track following means, are mounted to the trolleys and ride on tracks 132a and 114b. Advantageously, wheels 115 are disposed snugly on either side of tracks 132a and 114b so that the trolleys may be smoothly translated therealong. Wheels 115 may be rotatably mounted by means of axles 115a. Primary hoist 114 is pivotably mounted to frame 112 by means of shaft 117 or the like.

Pivot cylinder 134 rotates secondary hoist link 136 in direction E'. An extension cylinder 138 may be attached to a secondary hoist arm link 124b which pivots secondary hoist arms 124 on link 136. Link 136 is pinned or otherwise rotatably mounted to secondary hoist trolley 132.

In operation, secondary hoist arms 124 raise up under the remainder 118' of lumber stack 118 to take over translation of the remainder 118' of lumber stack 118, thereby freeing primary hoist 114 to lower in direction C' and to rotate back to the vertical in direction B' to pick up another lumber stack 118. Secondary hoist 122 includes hoisting means (not shown) which work in unison with the retraction and extension of hoist arms 124 allowing the secondary hoist arms 124 to lift up while the next lumber stack on the primary hoist arms begins to spill over shear point 128 with no need for pausing between the breakdown of the lumber stacks. The secondary arms are rotated in direction E' to just clear the top of the remainder 118' of the lumber stack being spilled.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A continuous breakdown tilt hoist comprising:

a primary tilt hoist, and an overhead secondary hoist, said primary tilt hoist and said overhead secondary hoist mounted on a supporting frame, wherein said primary tilt hoist includes parallel primary track members, and primary hoist arms selectively translatable on said primary track members, and wherein said overhead secondary hoist includes parallel secondary track members, and secondary hoist arms selectively translatable on said secondary track members and selectively pivotable relative to a secondary face on an upper end of said supporting frame, and wherein said primary tilt hoist is selectively pivotable relative to said supporting frame from a generally upright lumber stack receiving position to a reclined lumber stack translating position, and wherein said primary hoist arms are cantilevered outwardly of said primary track members so as to cooperate with an adjacent lumber stack conveyor to receive a first lumber stack from said lumber stack conveyor onto said primary hoist arms when said primary tilt hoist is in said lumber stack receiving position, wherein in said lumber stack translating position said primary hoist is reclined and said first lumber stack, when on said primary hoist arms, is reclined against a primary hoist face on said primary tilt hoist for sliding translation over said primary hoist face upon said selective translation of said primary hoist arms on said primary track members, and wherein, when said primary tilt hoist is in said reclined lumber stack translating position, said primary hoist face is generally flush with a stack receiving edge of said secondary face, said secondary face extending between said stack receiving edge and a tier shearing edge, wherein, at said tier shearing edge, first tiers of lumber sequentially shear from said first lumber stack as said first lumber stack is urged over said secondary face on said primary hoist arms as said primary hoist arms translate to a raised position, said secondary hoist arms selectively pivotable between an elevated non-engaging orientation and a lowered lumber stack engaging and translating orientation, said secondary hoist arms pivotable into said lowered lumber stack engaging and translating orientation when said primary hoist arms reach said raised position, said secondary hoist arms selectively translatable when in said lowered lumber stack engaging and translating orientation between a lumber stack engaging position adjacent and under said first lumber stack and a lumber stack discharged position generally adjacent said tier shearing edge, so as to translate said lumber stack over said secondary face and over said tier shearing edge, said secondary hoist arms selectively pivotable between said elevated non-engaging orientation and said lowered lumber stack engaging and translation orientation by means of a pivoting action about a pivot mounted below and upstream of said secondary hoist arms relative to a direction of translation of said first lumber stack up and along said primary face and said secondary face, and wherein said primary tilt hoist is pivotable from said reclined position to said lumber stack receiving position and said primary hoist arms translatable to a lower position for receiving a second lumber stack from said lumber stack conveyor, said reclining of said primary tilt hoist and said translation of said primary hoist arms from said lower position to said raised position, and said pivoting of said secondary hoist arms, selectively sequencable by sequencing means so that, as said secondary hoist arms reach said lumber stack discharged position so as to deposit a bottom-most tier of said first lumber stack over said tier shearing edge, said second lumber stack has been received from said lumber stack conveyor onto said primary hoist arms, reclined on said primary tilt hoist, and translated upwardly so as to position a top tier of said second lumber stack beneath and generally adjacent said secondary hoist arms as said secondary hoist arms reach said lumber stack discharged position and commence pivoting clear of said tier shearing edge into said elevated non-engaging orientation, said secondary hoist arms once pivoted into said elevated non-engaging orientation then translatable to said lumber stack engaging position and pivotable into said lowered lumber stack engaging and translating orientation beneath said second lumber stack.

2. The device of claim 1 wherein said secondary hoist arms are selectively pivotable on a pivot member.

3. The device of claim 2 wherein said pivot member is rigidly mounted to said secondary track members at one end of said pivot member, and pivotally mounted at an opposite end of said pivot member to said supporting frame, and wherein said secondary hoist arms are rigidly mounted to secondary hoist trolleys and, said secondary hoist trolleys are slidingly mounted on said secondary track members.

4. The device of claim 3 wherein said pivot member is pivotally mounted to said supporting frame generally at an end of said supporting frame adjacent said lumber stack conveyor.

5. The device of claim 4 wherein said secondary track members are generally parallel to said primary track members when said secondary hoist arms are in said lumber stack engaging and translating orientation.

6. The device of claim 5 wherein said secondary track members are offset above said primary track members when said secondary hoist arms are in said lumber stack engaging and translating orientation.

7. The device of claim 6 wherein said secondary hoist arms are lowered on said secondary track members so as to pivot said secondary hoist arms from said elevated non-engaging orientation to said lowered lumber stack engaging and translating orientation.

8. The device of claim 7 wherein said pivot member is a laterally spaced apart pair of first and second pivot members, laterally spaced apart so as to accommodate said first and second lumber stacks being translated therebetween on said primary tilt hoist.

9. The device of claim 8 wherein said secondary hoist arms extend perpendicularly from said secondary track members substantially a distance equal to said offset of said secondary track members above said primary track member when said secondary hoist arms are in said lumber stack engaging and translating orientation.

10. The device of claim 2 wherein pivot member is pivotally mounted at a first end of said pivot member to secondary hoist trolleys, said secondary hoist trolleys slidingly mounted on said secondary track members, and said pivot member is selectively pivotable relative to said secondary hoist trolleys.

11. The device of claim 10 wherein said pivot member is pivotally mounted at a second end of said pivot member, opposite said first end of said pivot member, to said secondary hoist arms, and said secondary hoist arms are selectively pivotable relative to said pivot member.

12. The device of claim 11 wherein said pivot member is at least one laterally spaced apart pair of link members, laterally spaced apart a distance to accept therebetween said first and second lumber stacks when translated on said primary tilt hoist.

13. In a continuous breakdown tilt hoist having a primary tilt hoist, and an overhead secondary hoist, said primary tilt hoist and said overhead secondary hoist mounted on a supporting frame, wherein said primary tilt hoist includes parallel primary track members, and primary hoist arms selectively translatable on said primary track members, and wherein said overhead secondary hoist includes parallel secondary track members, and secondary hoist arms selectively translatable on said secondary track members and selectively pivotable relative to a secondary face on an upper end of said supporting frame, and wherein said primary tilt hoist is selectively pivotable relative to said supporting frame from a generally upright lumber stack receiving position to a reclined lumber stack translating position, and wherein said primary hoist arms are cantilevered outwardly of said primary track members so as to cooperate with an adjacent lumber stack conveyor to receive a first lumber stack from said lumber stack conveyor onto said primary hoist arms when said primary tilt hoist is in said lumber stack receiving position, wherein in said lumber stack translating position said primary hoist is reclined and said first lumber stack, when on said primary hoist arms, is reclined against a primary hoist face on said primary tilt hoist for sliding translation over said primary hoist face upon said selective translation of said primary hoist arms on said primary track members, and wherein, when said primary tilt hoist is in said reclined lumber stack translating position, said primary hoist face is generally flush with a stack receiving edge of said secondary face, said secondary face extending between said stack receiving edge and a tier shearing edge, wherein, at said tier shearing edge, first tiers of lumber sequentially shear from said first lumber stack as said first lumber stack is urged over said secondary face on said primary hoist arms as said primary hoist arms translate to a raised position, said secondary hoist arms selectively pivotable between an elevated non-engaging orientation and a lowered lumber stack engaging and translating orientation, said secondary hoist arms pivotable into said lowered lumber stack engaging and translating orientation when said primary hoist arms reach said raised position, said secondary hoist arms selectively translatable when in said lowered lumber stack engaging and translating orientation between a lumber stack engaging position adjacent and under said first lumber stack and a lumber stack discharged position generally adjacent said tier shearing edge, so as to translate said lumber stack over said secondary face and over said tier shearing edge, said secondary hoist arms selectively pivotable between said elevated non-engaging orientation and said lowered lumber stack engaging and translation orientation by means of a pivoting action about a pivot mounted below and upstream of said secondary hoist arms relative to a direction of translation of said first lumber stack up and along said primary face and said secondary face, and wherein said primary tilt hoist is pivotable from said reclined position to said lumber stack receiving position and said primary hoist arms translatable to a lower position for receiving a second lumber stack from said lumber stack conveyor, said reclining of said primary tilt hoist and said translation of said primary hoist arms from said lower position to said raised position, and said pivoting of said secondary hoist arms, selectively sequencable by sequencing means so that, as said secondary hoist arms reach said lumber stack discharged position so as to deposit a bottom-most tier of said first lumber stack over said tier shearing edge, said second lumber stack has been received from said lumber stack conveyor onto said primary hoist arms, reclined on said primary tilt hoist, and translated upwardly so as to position a top tier of said second lumber stack beneath and generally adjacent said secondary hoist arms as said secondary hoist arms reach said lumber stack discharged position and commence pivoting clear of said tier shearing edge into said elevated non-engaging orientation, said secondary hoist arms once pivoted into said elevated non-engaging orientation then translatable to said lumber stack engaging position and pivotable into said lowered lumber stack engaging and translating orientation beneath said second lumber stack, a method of continuous breakdown of lumber stacks comprising the steps of:
  a) receiving said first lumber stack onto said primary hoist arms when said primary tilt hoist is in said lumber stack receiving position,
  b) reclining said primary tilt hoist into said lumber stack translating position and elevating said first lumber stack by translating said primary hoist arms to said raised position,
  c) pivoting said secondary hoist arms from said non-engaging orientation to said lowered lumber stack engaging and translating orientation in said lumber stack engaging position,
  d) translating, during a first time interval, said secondary hoist arms from said lumber stack engaging position to said lumber stack discharged position,
  e) simultaneously during said first time interval:
    i) translating said primary hoist arms from said raised position to said lowered position and pivoting said primary tilt hoist from said reclined lumber stack translating position to said lumber stack receiving position,
    ii) receiving a second lumber stack onto said primary hoist arms,
    iii) reclining said primary tilt hoist into said lumber stack translating position and elevating said second lumber stack so as to elevate said top tier of said second lumber stack to said tier shearing edge and so as to shear said top tier from said second lumber stack as said bottommost tier of said first lumber stack slides past said tier shearing edge,
  f) pivoting, at the end of said first time interval, said secondary hoist arms from said lowered lumber stack engaging and translating orientation to said non-engaging orientation, and simultaneously translating said secondary hoist arms to said lumber stack engaging position.

* * * * *